(12) United States Patent
Matsumoto et al.

(10) Patent No.: US 7,267,870 B2
(45) Date of Patent: Sep. 11, 2007

(54) PRESSURE-SENSITIVE ADHESIVE SHEET FOR STEEL PLATES

(75) Inventors: Mitsuo Matsumoto, Ibaraki (JP); Katsuhiko Tachibana, Ibaraki (JP); Manabu Matsunaga, Ibaraki (JP); Takio Itou, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 207 days.

(21) Appl. No.: 10/913,445

(22) Filed: Aug. 9, 2004

(65) Prior Publication Data

US 2005/0032448 A1    Feb. 10, 2005

(30) Foreign Application Priority Data

Aug. 8, 2003    (JP)    ............... P. 2003-206723

(51) Int. Cl.
*B32B 7/12*    (2006.01)

(52) U.S. Cl. .............. 428/343; 428/344; 428/354; 428/355 AC; 428/355 EP; 442/66; 442/151; 442/180

(58) Field of Classification Search ........... 442/180, 442/66, 64, 67, 71, 149, 151, 111, 112, 160, 442/162; 427/407.3; 428/343, 349, 354, 428/355 R, 356, 355 EP, 355 BL, 361
See application file for complete search history.

(56) References Cited

U.S. PATENT DOCUMENTS

| | | | |
|---|---|---|---|
| 3,386,527 A * | 6/1968 | Daubert et al. | 181/208 |
| 4,006,272 A * | 2/1977 | Sakaguchi et al. | 442/180 |
| 5,151,327 A * | 9/1992 | Nishiyama et al. | 428/343 |
| 5,780,366 A * | 7/1998 | Appelt et al. | 442/19 |

FOREIGN PATENT DOCUMENTS

| | | |
|---|---|---|
| JP | 07-068695 A | 3/1995 |
| JP | 09-123356 A | 5/1997 |

* cited by examiner

*Primary Examiner*—Terrel Morris
*Assistant Examiner*—Anish P. Desai
(74) *Attorney, Agent, or Firm*—Sughrue Mion PLLC

(57) ABSTRACT

A pressure-sensitive adhesive sheet for steel plates, which comprises a backing and a resin layer, wherein the backing comprises a resin-coated glass cloth obtainable by coating a glass cloth with a resin emulsion (A) followed by coating with a resin emulsion (B) which is different from the resin emulsion (A).

10 Claims, 1 Drawing Sheet

PRESSURE-SENSITIVE ADHESIVE SHEET FOR STEEL PLATES

FIELD OF THE INVENTION

The present invention relates to a pressure-sensitive adhesive sheet for steel plates, more precisely a pressure-sensitive adhesive sheet for steel plates, which is used for sticking onto steel plates for various industrial machinery such as transport machinery.

BACKGROUND ART

Heretofore, in order to reduce automobile body weight, a steel plate for automobile body is generally processed to a thin plate of 0.6 to 0.8 mm thick. Therefore, it is known that the body steel plate is attempted to be reinforced by sticking a steel plate-reinforcing sheet onto inner side of the steel plate.

Such steel plate-reinforcing sheet is, for example, stuck during an assembly step of the body steel plate and then heated to foam with the heat supplied during elecrodeposition coating to achieve reinforcement. For example, there is proposed a steel plate-reinforcing sheet wherein a foaming resin layer is laminated onto a backing (for example, cf. JP-A-7-68695).

Moreover, since the body steel plate is a thin plate, a vibration sound generates while moving and noise may be generated at door opening and closure. Therefore, in order to prevent the generation of these vibration sound and noise, there is proposed a damping sheet wherein a rubber composition is laminated onto a backing (for example, cf. JP-A-9-123356).

SUMMARY OF THE INVENTION

In such steel plate-reinforcing sheet and damping sheet, however, a resin-coated glass cloth wherein a glass cloth is coated with a resin is employed as a backing. In particular, in view of thermal resistance, workability, and adhesiveness between a foaming resin layer and a damping layer, a resin-coated glass cloth wherein a glass cloth is coated with a melamine resin is widely employed.

However, from the viewpoint of recent environmental measures, it has been required to restrict generation of organic volatile components from automobile parts and members strictly. Since harmful substances (VOC) such as formaldehyde and acetaldehyde are generated from the resin-coated glass cloth wherein the glass cloth is coated with a melamine resin, there arises an inconvenience that the cloth cannot satisfy such requirement. Formaldehyde and acetaldehyde cause remarkable deterioration of working environment by their irritating odor and is a cause for the increase of allergy-suffering patients.

On the other hand, though weight saving is required for the resin-coated glass cloth to be used in such steel plate-reinforcing sheet or damping sheet, there arise inconveniences that glass filaments become loose from the glass cloth and properties such as strength and elasticity as well as adhesiveness with the foaming resin layer or rubber composition layer to be laminated on the glass cloth are not satisfactory when an amount of the coating resin is reduced for saving weight.

The loosing of the glass filaments is problematic in the case that the steel plate-reinforcing sheet or damping sheet is processed, for example, punched or cut, and the insufficient strength and elastic modulus influence reinforcing and damping properties.

The invention is accomplished in consideration of such inconveniences and its object is to provide a pressure-sensitive adhesive sheet for steel plates, which has an excellent reinforcing and damping properties and also which reduces generation of organic volatile components.

Specifically, the present invention has the following constitution.

(1) A pressure-sensitive adhesive sheet for steel plates, which comprises a backing and a resin layer, wherein the backing comprises a resin-coated glass cloth obtainable by coating a glass cloth with a resin emulsion (A) followed by coating with a resin emulsion (B) which is different from the resin emulsion (A).

(2) The pressure-sensitive adhesive sheet according to the above 1, wherein the resin emulsion (A) and the resin emulsion (B) substantially comprise no melamine resin in the resin-coated glass cloth.

(3) The pressure-sensitive adhesive sheet according to the above (1) or (2), wherein the resin emulsion (A) is a styrene-based resin emulsion in the resin-coated glass cloth.

(4) The pressure-sensitive adhesive sheet for steel plates according to the above (1) or (2), wherein the resin emulsion (B) is an epoxy-based resin emulsion in the resin-coated glass cloth.

(5) The pressure-sensitive adhesive sheet according to the above (1) or (2), wherein the resin emulsion (A) is a styrene-based resin emulsion and the resin emulsion (B) is an epoxy-based resin emulsion in the resin-coated glass cloth.

(6) The pressure-sensitive adhesive sheet according to any one of the above (1) to (5), wherein, in the resin-coated glass cloth, the resin emulsion (A) is attached to the glass cloth in an amount of 2 to 15% by weight as dry weight based on the total amount of the glass cloth, and the resin emulsion (B) is attached to the glass cloth in an amount of 0.01 to 5% by weight as dry weight based on the total amount of the glass cloth.

(7) The pressure-sensitive adhesive sheet according to any one of the above (1) to (6), wherein the resin layer comprises a foaming resin composition comprising an epoxy resin and a foaming agent.

(8) The pressure-sensitive adhesive sheet according to the above (7), wherein the epoxy resin is an aromatic epoxy resin.

(9) The pressure-sensitive adhesive sheet according to any one of the above (1) to (6), wherein the resin layer comprises a foaming resin composition comprising an aromatic epoxy resin, a styrene-based synthetic rubber, and a foaming agent.

(10) The pressure-sensitive adhesive sheet according to any one of the above (1) to (6), wherein the resin layer comprises a rubber composition comprising a rubber.

In the present invention, loosing of glass filaments from the glass cloth can be prevented and rigidity of the glass cloth can be controlled by coating a glass cloth with the resin emulsion (A), and furthermore, adhesiveness with other members such as a foaming resin layer and a damping layer can be improved by coating the cloth with the resin emulsion (B).

BRIEF DESCRIPTION OF THE DRAWINGS

FIG. 1 is a process drawing illustrating one example of the method for sticking the pressure-sensitive adhesive sheet for steel plates according to the invention onto a steel plate, wherein FIG. 1(a) represents a step of preparing a pressure-sensitive adhesive sheet for steel plates and peeling off the releasing paper, FIG. 1(b) represents a step of sticking the pressure-sensitive adhesive sheet for steel plates to a steel plate, and FIG. 1(c) represents a step of heating the pressure-sensitive adhesive sheet for steel plates to effect foaming.

Figure 1:
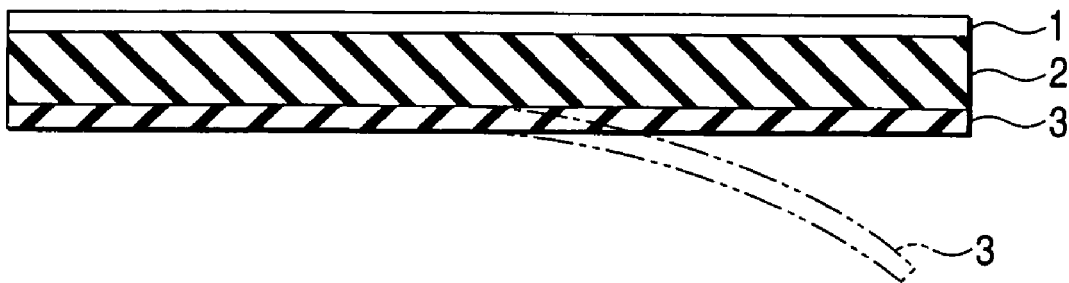
Figure 1:
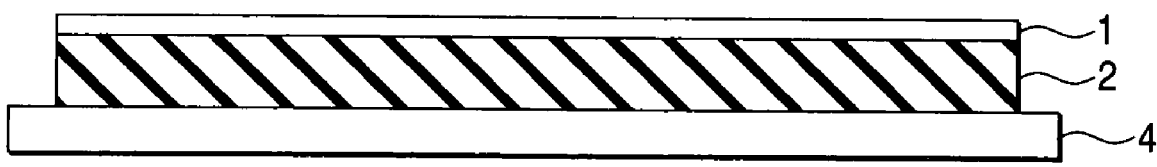
Figure 1:
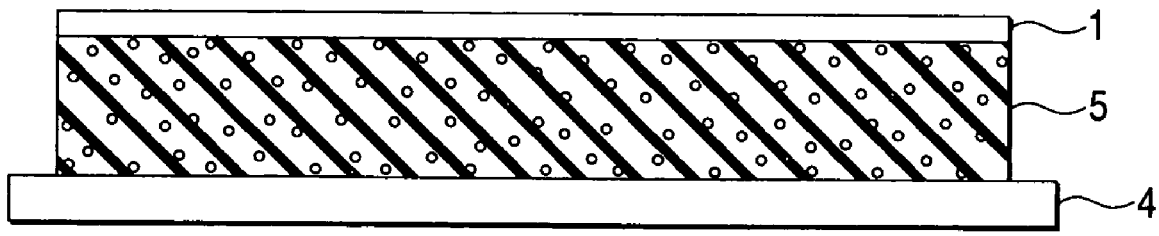

In FIG., sign 1 is a backing, sign 2 is a resin layer, sign 3 is a releasing paper, sign 4 is a steel plate and sign 5 is a foamed layer.

DETAILED DESCRIPTION OF THE INVENTION

The pressure-sensitive adhesive sheet for steel plates according to the invention comprises a backing and a resin layer.

In the invention, the backing imparts toughness to the resin layer and comprises a resin-coated glass cloth obtainable by coating a glass cloth with a resin emulsion (A) followed by coating with a resin emulsion (B) which is different from the resin emulsion (A).

The grass fibers as the warp and weft for use in weaving the above glass cloth have a single yarn diameter of about 6 to 11 μm, preferably about 9 to 11 μm and number of single yarns of about 50 to 800, preferably about 200 to 800.

Examples of the glass fibers include fibers called DE300, DE150, DE75, E225, E113, G150, G75, and G37. Of these, G75 and DE75 are suitably used. As raw glass for such glass fibers, glass called E glass (no-alkali glass) is usually employed but, in addition to the glass, silica glass, D glass (low dielectric property), S glass (high strength), C glass (alkali lime), H glass (high dielectric property), and the like can be also employed.

After the glass fibers are subjected to a warping step and, if desired, a sizing step, weaving of the glass cloth can be carried out in accordance with a known method using, for example, a jet loom (air-jet loom, water-jet loom, etc.), Sulzer loom, or rapier loom. In the above sizing step, it is preferable to add a sizing agent (secondary binder) to the warp according to a known method.

Examples of such sizing agent include starch, a surfactant, a lubricant, a synthetic oil agent, poval, and an acrylic polymer. The weave texture of the glass cloth formed by the weaving of the glass cloth includes plain fabric, satin fabric, mat weave, twill fabric, and the like, but plain fabric is preferable.

Moreover, after weaving of the glass cloth using the above glass yarn or, after heat cleaning or after treatment with a silane coupling agent, if desired, by subjecting the cloth to, for example, weave-opening under pressure of water flow, weave-opening with high-frequency vibration using a liquid as a medium, processing under pressure with roll, or the like, the width between yarns constituting the glass cloth is enlarged to facilitate the formation of a structure wherein adjacent yarns in both of the warp and weft are most suitably arranged.

By the above treatment, the yarns become flat and the shape at cross section of the yarns changes from an elliptical shape to a nearly flat shape, whereby distribution of the glass fibers in the glass cloth becomes more homogeneous.

After weaving, if desired, the above sizing agent (secondary binder) is removed by subjecting the glass cloth to heat cleaning treatment or the like according to a well-known technology. Then, the glass cloth may be treated with a silane coupling agent. Specific examples of the silane coupling agent include vinyltrichlorosilane, vinyltriethoxysilane, vinyltris(β-methoxyethoxy)silane, γ-methacryloxypropyltrimethoxysilane, γ-aminopropyltriethoxysilane, γ-anilinoprpyltrimethoxysilane, N-β-aminoethyl-γ-aminopropyltrimethoxysilane, N-vinylbenzyl-aminoethyl-γ-aminopropyltrimethoxysilane (hydrochloride), γ-glycidoxypropyltrimethoxysilane, β-(3,4-epoxycyclohexyl)ethyltrimethoxysilane, β-mercaptopropyltrimethoxysilane, and γ-chloropropyltrimethoxysilane. These silane coupling agents may be used solely or in combination. Of these, γ-glycidoxypropyltrimethoxysilane is preferable.

For example, the adhered amount of such coupling agent to the glass cloth substrate is suitably from about 0.01 to 2% by weight, preferably about 0.05 to 0.5% by weight based on the total amount of the glass cloth.

As mentioned above, after the glass cloth is, if desired, subjected to weave-opening treatment and also, if desired, treated with a silane coupling agent, it is dried in accordance with a known means. The glass cloth for use in the invention is a glass cloth wherein a void ratio X between the warp yarns or weft yarns constituting the glass cloth is obtained from the following equation (1) and the void ratio X between the warp yarns or weft yarns desirably satisfies the following equation (2):

$$X=(b/a)\times 100 \tag{1}$$

$$X \leq 5 \tag{2}$$

wherein X represents a void ratio (%) between the warp or the weft constituting the glass cloth, a represents a distance (μm) from the center to the center of the width of two adjacent warp yarns or a distance (μm) from the center to the center of the width of two adjacent weft yarns, and b represents a space (μm) between two adjacent warp yarns or weft yarns.

In the case that the void ratio X between the warp yarns or weft yarns constituting the glass cloth does not satisfy the range represented by the equation (2), the resin layer (foaming resin composition, rubber composition) may permeate to backside of the resin-coated glass cloth to cause a risk of poor workability, when such resin-coated glass cloth is used as the backing of the pressure-sensitive adhesive sheet for steel plates according to the invention.

Then, the glass cloth is treated with a resin emulsion for preventing the loosing of glass filaments from the glass cloth or for controlling rigidity of the glass cloth (this treatment is referred to as primary treatment).

In the invention, as the glass cloth to be subjected to the primary treatment, any of a raw cloth, a calcinated cloth, or a heat-cleaned glass cloth may be used or any of the glass cloths obtained by treating the raw cloth, calcinated cloth, or heat-cleaned glass cloth with a silane coupling agent.

Examples of the resin emulsion (A) for the primary treatment include styrene-based resin emulsions, acrylic resin emulsions, vinyl acetate resin emulsions, and ethylene-vinyl acetate (EVA) resin emulsions. Of these resin emulsions, styrene-based resin emulsions are preferable in view of prevention of the loosing of glass cloth filaments and rigidity control of the glass cloth. The styrene-based resin emulsions include polystyrene or HIPS resin emulsions and styrene-based emulsions comprising one or two or more resins selected from the group consisting of AS resins, ABS resins, ACS resins, AES resins, MBS resins, or AAS resins. Introduction of a styrene skeleton into the glass cloth by treating the glass cloth with the styrene-based resin emulsion improves rigidity and thermal resistance of the glass cloth.

The adhered amount of the resin emulsion (A) for use in the coating as the primary treatment is usually about 2 to 15% by weight, preferably about 5 to 8% by weight as a dry weight based on the total amount of the glass cloth.

When the adhered amount of the resin component is less than about 2% by weight as a dry weight based on the total amount of the glass cloth, the improvement in rigidity and loosing property (loosing of filaments from glass cloth) of the coated glass cloth is sometimes poor. On the other hand, when it exceeds about 15% by weight, the treated glass cloth is too hard and hence becomes brittle in some cases.

The treatment with the resin emulsion (A) for the primary treatment is carried out by applying the treating agent to one side or both sides of the glass cloth according to the invention in a desired amount or by dipping the cloth into the treating agent charged in a bath, lifting up the cloth, squeezing an excess amount of the agent, and drying the cloth.

A known method can be employed as the applying method and examples thereof include methods carried out using an applicator, a knife coater, a reverse roll coater, a gravure coater, a flow coater, a rod coater, or a brush.

After the glass cloth is subjected to the above primary treatment, the resulting cloth is treated with a resin emulsion (B), which is different from the resin emulsion (A), for improving adhesiveness between the glass cloth and the other members (this treatment is referred to as secondary treatment). Namely, only the primary treatment of the glass cloth cannot impart an excellent adhesiveness and improvement of the adhesiveness is first attained by the secondary treatment.

In the invention, by adopting the method of carrying out the secondary treatment subsequently to the primary treatment, use of only a small amount of an adhesiveness-improving resin such as an epoxy resin enables an efficient improvement of the adhesiveness and, at the same time, cost can be reduced. Also, thereby, there do not arise problems of complication of blending operation, generation of precipitation in a blended solution, and shortened life of the blended solution.

Examples of the resin emulsion (B) for the secondary treatment include epoxy-based resin emulsions, urethane-based resin emulsions, and olefin-based resin emulsions. Of these resin emulsions, epoxy-based resin emulsions are preferable in view of the adhesiveness. By treating the glass cloth with an epoxy-based resin emulsion, the adhesiveness of the glass cloth with the above resin layer, in particular the adhesiveness at a low temperature, is improved.

Examples of the epoxy-based resin emulsions for use in the invention include bisphenol A-type epoxy resins, bisphenol F-type epoxy resins, co-condensation-type epoxy resins of bisphenol A and bisphenol F, novolak-type epoxy resins, biphenyl-type epoxy resins, dicyclopentadiene-phenol-based co-condensation-type epoxy resins, and halogen-substituted resins thereof.

The adhered amount of the resin emulsion (B) for use in the coating as the secondary treatment is usually from about 0.01 to 5% by weight, preferably from about 0.05 to 2.5% by weight as a dry weight based on the total amount of the glass cloth.

When the adhered amount of the resin component is less than about 0.01% by weight as a dry weight based on the total amount of the glass cloth, the adhesiveness with the above resin layer, in particular the adhesiveness at a low temperature, is not improved in some cases. When it exceeds about 5% by weight, the level of the adhesiveness is ordinary not varied.

In the invention, when a melamine resin which has been hitherto widely used is employed as the resin emulsion (A) for the primary treatment and the resin emulsion (B) for the secondary treatment, formaldehyde and acetaldehyde are formed during the processing of the glass cloth. Therefore, in the invention, the resin emulsion (A) and the resin emulsion (B) are desirably comprise substantially no melamine resin.

In the invention, the term "substantially" herein means an amount of 10% by weight or less, preferably 5% by weight or less based on the total resin.

The thickness of the backing comprising the resin-coated glass cloth obtained as above is usually from about 100 to 300 μm, preferably from about 150 to 250 μm.

In the invention, the resin layer preferably comprises a foaming composition when the pressure-sensitive adhesive sheet for steel plates according to the invention is used for the purpose of reinforcement of steel plates. Alternatively, when the pressure-sensitive adhesive sheet for steel plates according to the invention is used for the purpose of damping of steel plates, the layer preferably comprises a rubber composition.

The foaming composition comprises an epoxy resin and a foaming agent. The epoxy resin is not particularly limited and includes aliphatic epoxy resins, aromatic epoxy resins, and modified epoxy resins.

Examples of the aliphatic epoxy resins include linear aliphatic epoxy resins, cyclic aliphatic epoxy resins, and heterocyclic aliphatic epoxy resins.

The aromatic epoxy resins are epoxy resins comprising a benzene ring as a constitutional unit in the molecular chain and are not particularly limited. Examples thereof include bisphenol-type epoxy resins such as bisphenol A-type epoxy resins, dimer acid-modified bisphenol A-type epoxy resins, bisphenol F-type epoxy resins, and bisphenol S-type epoxy resins; novolak-type epoxy resins such as phenol-novolak-type epoxy resins and cresol-novolak-type epoxy resins; and naphthalene-type epoxy resins.

Examples of the modified epoxy resins include dimer acid-modified bisphenol A-type epoxy resins, amine-modified bisphenol A-type epoxy resins, and alcohol-modified bisphenol A-type epoxy resins.

These epoxy resins may be used solely or in combination. Of these epoxy resins, in view of the reinforcement and adhesiveness, the aromatic epoxy resins are preferable, and in particular, bisphenol-type epoxy resins are preferably used.

Moreover, such epoxy resins have an epoxy equivalent of, for example, 150 to 350 g/eqiv., preferably 200 to 300 g/eqiv. In this regard, the epoxy equivalent can be calculated based on the oxirane oxygen concentration measured by titration with hydrogen bromide.

As the foaming agent, inorganic foaming agents and organic foaming agents may be mentioned.

Examples of the inorganic foaming agents include ammonium carbonate, ammonium hydrogen carbonate, sodium hydrogen carbonate, ammonium nitrite, sodium borohydride, and azides.

Examples of the organic foaming agents include N-nitroso compounds such as N,N'-dinitorosopentamethylenetetramine and N,N'-dimethyl-N,N'-dinitorsoterephthalamine; azo compounds such as azobisisobutyronitrile, azodicarbonamide, and barium azodicarboxylate; fluorinated alkanes such as trichloromonofluoromethane and dichloromonofluoromethane; hydrazine compounds such as p-toluenesulfonyl hydrazide, diphenylsulfone-3,3'-disulfonyl hydrazide, 4,4'-oxybis(benzenesulfonyl hydrazide), and allylbis(sulfonyl hydrazide); semicarbazide compounds such as p-toluylenesulfonyl semicarbazide and 4,4'-oxybis (benzenesulfonyl semicarbazide); and triazole compounds such as 5-morpholyl-1,2,3,4-thiatriazole.

In this regard, as the foaming agent, use may be made of thermally expansive fine particles wherein a heat-expansive substance such as isobutane or pentane is included in microcapsules which are microcapsules made of a thermoplastic resin such as vinylidene chloride, acrylonitrile, an acrylate ester, or a methacrylate ester. As such thermally expansive fine particles, a commercially available product such as Microsphere (trade name, manufactured by Matsumoto Yushi-Seiyaku Co., Ltd.) may be used, for example.

They may be used solely or in combination. Moreover, of these foaming agents, 4,4'-oxybis(benzenesulfonyl hydrazide) is preferably used in view of stable foaming with no influence of external factors.

The mixing ratio of the foaming agent is, for example, from 1.0 to 10 parts by weight, preferably 2.0 to 8.0 parts by weight based on 100 parts by weight of the resin component which refers to the total of the epoxy resin and styrene-based synthetic rubber to be mentioned below and refers to only the epoxy resin when no styrene-based synthetic rubber is included (the same shall apply to the description hereinafter).

When the mixing ratio of the foaming agent is less than the range, foaming is insufficient and the reinforcing property lowers owing to insufficient thickness in some cases. On the other hand, when the ratio is more than the range, the density decreases and hence the reinforcing property lowers in some case.

It is preferable that such foaming agent composition further comprises a styrene-based synthetic rubber. The styrene-based synthetic rubber is a synthetic rubber comprising styrene of a starting material as a constitutional unit in the molecular chain and is not particularly limited.

Examples thereof include styrene-butadiene rubbers such as styrene-butadiene random copolymers, styrene-butadiene-styrene block copolymers, and styrene-ethylene-butadiene-styrene block copolymers, and styrene-isoprene rubbers such as styrene-isoprene-styrene block copolymers. They may be used solely or in combination. Of these styrene-based synthetic rubbers, styrene-butadiene rubbers are preferably used in view of the reinforcing property and adhesiveness to an oily surface.

As the styrene-based synthetic rubbers, those having a number-average molecular weight of 30,000 or more, preferably 50,000 to 1,000,000 may be used. When the number-average molecular weight is less than 30,000, the adhesiveness, in particular the adhesiveness to an oily surface steel plate, lowers in some cases.

Moreover, such styrene-based synthetic rubbers have a styrene content of preferably 50% by weight or less, more preferably 35% by weight or less. When the styrene content is more than the value, the adhesiveness at a low temperature lowers in some cases.

Furthermore, such styrene-based synthetic rubbers desirably have a Mooney viscosity of, for example, 20 to 60 (ML1+4 at 100° C.), preferably 30 to 50 (ML1+4 at 100° C.)

The mixing ratio of the styrene-based synthetic rubber is, for example, from 30 to 70 parts by weight, preferably 40 to 60 parts by weight relative to 100 parts by weight of the resin component which refers to the total of the epoxy resin and styrene-based synthetic rubber to be mentioned below and refers to only the epoxy resin when no styrene-based synthetic rubber is included (the same shall apply to the description hereinafter).

When the mixing ratio of the styrene-based synthetic rubber is less than the range, the adhesiveness to the oily surface steel plate lowers in some cases. On the other hand, when the ratio is more than the range, the reinforcing property lowers in some case.

Such foaming composition preferably comprises an epoxy-modified styrene-based synthetic rubber in addition to the above components. By incorporating the epoxy-modified styrene-based synthetic rubber, compatibility between the styrene-based synthetic rubber and the aromatic epoxy resin can be improved, whereby the adhesiveness and reinforcing property can be further improved.

As the epoxy-modified styrene-based synthetic rubber, preferably used is, for example, a synthetic rubber wherein the terminal and inside of the molecular chain of the above styrene-based synthetic rubber are modified with epoxy groups and whose epoxy equivalent is, for example, from 100 to 10,000 g/eqiv., further from 400 to 3,000 g/eqiv. In this regard, a known method is used for modifying the styrene-based synthetic rubber with epoxy groups. For example, double bonds in the styrene-based synthetic rubber may be reacted with an epoxydizing agent such as a peracid or a hydroperoxide in an inert solvent.

As the epoxy-modified styrene-based synthetic rubber, use may be made of, for example, A-B type block copolymers and A-B-A type block copolymers wherein A represents a styrene polymer block, B represents a conjugate diene polymer block such as a butadiene polymer block or an isoprene polymer block, and epoxy groups are introduced into the B polymer block.

More specifically, epoxy-modified styrene-butadiene-styrene block copolymers, epoxy-modified styrene-ethylene-butadiene-styrene block copolymers, and epoxy-modified styrene-isoprene-styrene block copolymers are used, for example. They may be used solely or in combination. Moreover, of these epoxy-modified styrene-based synthetic rubbers, epoxy-modified styrene-butadiene-styrene block copolymers are preferably used in view of both of the reinforcing property and adhesiveness.

In the above A-B type block copolymers and A-B-A type block copolymers, the A block which is a styrene polymer block preferably has a weight-average molecular weight of about 1,000 to 10,000 and a glass transition temperature of 7° C. or higher. Moreover, the B block which is a conjugate diene polymer block preferably has a weight-average molecular weight of about 10,000 to 500,000 and a glass transition temperature of −20° C. or lower. Furthermore, the weight ratio of the A block copolymer to the B block copolymer is from 2/98 to 50/50, further from 15/85 to 30/70 as the A block copolymer/the B block copolymer.

The mixing ratio of the epoxy-modified styrene-based synthetic rubber is, for example, from 1 to 20 parts by weight, preferably 5 to 15 parts by weight based on 100 parts by weight of the resin component. When the mixing ratio of the epoxy-modified styrene-based synthetic rubber is less than the range, the reinforcing property and adhesiveness lower in some cases. On the other hand, when the ratio is more than the range, the adhesiveness at a low temperature lowers in some case.

Furthermore, such foaming composition preferably comprises an epoxy resin-curing agent and/or a rubber-crosslinking agent in addition to the above components. By incorporating the epoxy resin-curing agent and/or rubber-crosslinking agent, the reinforcing property can be improved.

As the epoxy resin-curing agent, a known curing agent for epoxy resins may be used and examples thereof include amine compounds, acid anhydride compounds, amide compounds, hydrazide compounds, imidazole compounds, and imidazoline compounds. In addition, phenol compounds, urea compounds, polysulfide compounds, and the like may be mentioned.

Examples of the amine compounds include ethylenediamine, propylenediamine, diethylenetriamine, triethylenetetramine, and amine adducts thereof, as well as metaphenylenediamine, diaminodiphenylmethane, and diaminodiphenyl sulfone.

Examples of the acid anhydride compounds include phthalic anhydride, maleic anhydride, tetrahydrophthalic anhydride, hexahydrophthalic anhydride, methylnajic anhydride, pyromellitic anhydride, dodecenylsuccinic anhydride, dichlorosuccinic anhydride, benzophenonetetracarboxylic anhydride, and chlorendic anhydride.

Examples of the amide compounds include dicyandiamide and polyamide.

Examples of the hydrazides include dihydrazide.

Examples of the imidazole compounds include methylimidazole, 2-ethyl-4-methylimidazole, ethylimidazole, isopropylimidazole, 2,4-dimethylimidazole, phenylimidazole, undecylimidazole, heptadecylimidazole, and 2-phenyl-4-methylimidazole.

Examples of the imidazoline compounds include methylimidazoline, 2-ethyl-4-methylimidazoline, ethylimidazoline, isopropylimidazoline, 2,4-dimethylimidazoline, phenylimidazoline, undecylimidazoline, heptadecylimidazoline, and 2-phenyl-4-methylimidazoline.

They may be used solely or in combination. Moreover, of these epoxy resin-curing agents, dicyandiamide is preferably used in view of the adhesiveness.

The mixing ratio of the epoxy resin-curing agent is, for example, from 0.5 to 15 parts by weight, preferably 1 to 10 parts by weight relative to 100 parts by weight of the resin component. When the mixing ratio of the epoxy resin-curing agent is less than the range, the reinforcing property lowers in some cases. On the other hand, when the ratio is more than the range, the storage stability becomes poor in some case.

As the rubber-crosslinking agent, use may be made of a known rubber-crosslinking agent (vulcanizing agent) capable of crosslinking styrene-based synthetic rubbers and epoxy-modified styrene-based synthetic rubbers. Examples of such rubber-crosslinking agent include sulfur; sulfur compounds; selenium; magnesium oxide; lead monoxide; organic peroxides such as dicumyl peroxide, 1,1-di-tert-butylperoxy-3,3,5-trimethylcyclohexane, 2,5-dimethyl-2,5-di-tert-butylperoxyhexyne, 1,3-bis(tert-butylperoxyisopropyl)benzene, tert-butylperoxy ketone, and tert-butylperoxy benzoate; polyamines; oximes such as p-quinone dioxime and p,p'-dibenzoylquinone dioxime; nitroso compounds such as p-dinitrobenzine; resins such as alkylphenol-formaldehyde resins and melamine-formaldehyde condensates; and ammonium salts such as ammonium benzoate. They may be used solely or in combination. Moreover, of these rubber-crosslinking agents, sulfur is preferably used in view of the curing and reinforcing properties.

The mixing ratio of the rubber-crosslinking agent is, for example, from 10 to 20 parts by weight, preferably 2 to 15 parts by weight relative to 100 parts by weight of the resin component. When the mixing ratio of the rubber-crosslinking agent is less than the range, the reinforcing property lowers in some cases. On the other hand, when the ratio is more than the range, the adhesiveness lowers and the ratio is disadvantageous in cost in some case.

Moreover, in addition to the above components, such foaming composition may suitably comprise known additives such as a foaming auxiliary, a curing accelerator, a crosslinking accelerator, a filler, a tackifier, and a pigment, and also, if necessary, a thixotropic agent such as montmorillonite, a lubricant such as stearic acid, an antiscorching agent, a stabilizer, a softener, a plasticizer, an antiaging agent, an antioxidant, an ultraviolet absorbent, a colorant, a fungicide, and a flame retardant.

Examples of the foaming auxiliary include zinc stearate, urea compounds, salicylic compounds, and benzoic compounds. These foaming auxiliaries can be used solely or in combination and the mixing ratio thereof is, for example, from 0.5 to 10 parts by weight, preferably from 1 to 5 parts by weight based on 100 parts by weight of the resin component.

Examples of the curing accelerator include imidazoles, tertiary amines, phosphorus compounds, quaternary ammonium salts, and organometallic salts. These curing accelerators can be used solely or in combination and the mixing ratio thereof is, for example, from 0.5 to 20 parts by weight, preferably from 1 to 10 parts by weight based on 100 parts by weight of the resin component.

Examples of the crosslinking accelerator include zinc oxide, dithiocarbamates, thiazoles, guanidines, sulfenamides, thiurams, xanthates, aldehyde ammonias, aldehyde amines, thioureas. These crosslinking accelerators can be used solely or in combination and the mixing ratio thereof is, for example, from 1 to 20 parts by weight, preferably from 3 to 15 parts by weight based on 100 parts by weight of the resin component.

Examples of the filler include calcium carbonates such as calcium bicarbonate, light calcium carbonate, and white ENKA, talc, mica, clay, mica powder, bentonite, silica, alumina, aluminum silicate, titanium oxide, acetylene black, and aluminum powder.

These fillers can be used solely or in combination and the mixing ratio thereof is, for example, from 50 to 150 parts by weight, preferably from 75 to 125 parts by weight based on 100 parts by weight of the resin component.

Examples of the tackifier include rosin resins, terpene resins such as terpene-aromatic liquid resins, chroman indene resins, petroleum resins such as C5 petroleum resins and C5/C9 petroleum resins, phenol resins, xylene resins, and alkyd resins. These tackifiers can be used solely or in combination and the mixing ratio thereof is, for example, from 10 to 200 parts by weight, preferably from 20 to 150 parts by weight based on 100 parts by weight of the resin component.

Examples of the pigment include carbon black. The mixing ratio thereof is, for example, from 0.5 to 20 parts by weight, preferably from 2 to 10 parts by weight based on 100 parts by weight of the resin component.

The foaming composition can be prepared as a kneaded product by mixing the above respective components in the above mixing ratios and kneading the mixture using, e.g., a mixing roll, a pressure kneader, or an extruder which is not particularly limited thereto. It is preferable to prepare the kneaded product so as to have a flow tester viscosity (60° C., 20 kg load) of, for example, 1,000 to 5,000 Pa·s, further 1,500 to 4,000 Pa·s.

Thereafter, the resulting kneaded product is rolled by, for example, calendar molding, extrusion molding, or press molding under a temperature condition under which the foaming agent is substantially not decomposed, whereby a resin layer comprising the foaming composition is formed. Then, the resin layer is laminated to the backing to obtain the pressure-sensitive adhesive sheet for steel plates.

The thickness of the resin layer comprising the foaming composition thus formed is, for example, from 0.2 to 3.0 mm, preferably from 0.5 to 1.3 mm. The total thickness of the backing and the resin layer comprising the foaming composition is, for example, from 0.3 to 3.3 mm, preferably from 0.65 to 1.55 mm.

Incidentally, to the resulting pressure-sensitive adhesive sheet for steel plates, a leasing paper may be stuck onto the surface of the resin layer, if necessary.

In the pressure-sensitive adhesive sheet for steel plates thus obtained, the volume foaming magnification of the foaming composition to be used as the resin layer at foaming is preferably from 1.5 to 4.0, further from 2.0 to 3.5. Moreover, the density (weight (g) of the foamed layer/ volume of the foamed layer (g/cm$^3$)) of the foamed layer after foaming the resin layer is, for example, from 0.2 to 0.8 g/cm$^3$, further from 0.3 to 0.7 g/cm$^3$.

In the invention, the resin layer comprises a rubber composition in the case that the pressure-sensitive adhesive sheet for steel plates is used for the purpose of damping the steel plate. The rubber composition comprises at least a rubber.

Examples of the rubber include styrene-butadiene rubbers such as styrene-butadiene random copolymers, styrene-butadiene-styrene block copolymers, styrene-ethylene-butadiene copolymers, and styrene-ethylene-butadiene-styrene copolymers; styrene-isoprene rubbers such as styrene-isoprene-styrene block copolymers; styrene-isoprene-butadiene rubbers; polybutadiene rubbers such as 1,4-polybutadiene rubbers, syndiotactic 1,2-polybutadiene rubbers, and acrylonitrile-butadiene rubbers; polyisobutylene rubber; polyisoprene rubber; chloroprene rubber; isobutylene-isoprene rubbers; nitrile rubber; butyl rubber; nitrile butyl rubber; acrylic rubber; reclaimed rubber; and natural rubber. These rubbers may be used solely or in combination.

Of these rubbers, styrene-butadiene rubbers and butyl rubber are preferably used in view of the adhesiveness, thermal resistance, and damping property.

Moreover, in addition to the above components, such rubber composition may suitably comprise known additives such as a filler, a tackifier, a softener, and a pigment, and also, if necessary, a crosslinking agent such as sulfur, a crosslinking accelerator, oils and fats such as animal oils and fats, vegetable oils and fats, and mineral oils, a thixotropic agent such as montmorillonite, a lubricant such as stearic acid, an antiscorching agent, a stabilizer, a plasticizer, an antiaging agent, an antioxidant, an ultraviolet absorbent, a colorant, a fungicide, and a flame retardant.

As the filler, fillers similar to the fillers to be used in the foaming composition may be mentioned, for example. These fillers may be used solely or in combination and the mixing ratio thereof is, for example, from 20 to 250 parts by weight, preferably from 100 to 200 parts by weight relative to 100 parts by weight of the rubber.

As the tackifier, tackifiers similar to the tackifiers to be used in the foaming composition may be mentioned, for example. These tackifiers may be used solely or in combination and the mixing ratio thereof is, for example, from 10 to 150 parts by weight, preferably from 50 to 100 parts by weight relative to 100 parts by weight of the rubber.

Examples of the softener include liquid resins, phthalate esters, phosphate esters, chlorinated paraffins, polybutene, and polyisobutylene. These softeners may be used solely or in combination and the mixing ratio thereof is, for example, from 10 to 150 parts by weight, preferably from 50 to 100 parts by weight relative to 100 parts by weight of the rubber.

As the pigment, pigments similar to the pigments to be used in the foaming composition may be mentioned, for example. These pigments may be used solely or in combination and the mixing ratio thereof is, for example, from 2 to 100 parts by weight, preferably from 10 to 50 parts by weight relative to 100 parts by weight of the rubber.

The rubber composition can be prepared as a kneaded product by mixing the above respective components in the above mixing ratios and kneading the mixture using, e.g., a mixing roll, a pressure kneader, or an extruder which is not particularly limited thereto.

It is preferable to prepare the kneaded product thus obtained so as to have a flow tester viscosity (50° C., 20 kg load) of, for example, 5,000 to 30,000 Pa·s, further 10,000 to 20,000 Pa·s.

Thereafter, the resulting kneaded product is rolled by, for example, calendar molding, extrusion molding, or press molding to form a resin layer comprising the rubber composition, and then the resin layer is laminated to the backing to obtain the pressure-sensitive adhesive sheet for steel plates.

The thickness of the resin layer comprising the rubber composition thus formed is, for example, from 0.8 to 3.0 mm, preferably from 1.0 to 2.0 mm. The total thickness of the backing and the resin layer comprising the rubber composition is, for example, from 0.9 to 3.3 mm, preferably from 1.15 to 2.25 mm.

Incidentally, to the resulting pressure-sensitive adhesive sheet for steel plates, a leasing paper may be stuck onto the surface of the resin layer, if necessary.

The thus obtained pressure-sensitive adhesive sheet for steel plates according to the invention is used for reinforcing or damping the steel plate by sticking it onto the steel plate of various industrial machinery such as transport machinery. More specifically, the pressure-sensitive adhesive sheet for steel plates according to the invention is a sheet wherein the resin layer 2 is laminated onto the backing 1 and, if necessary, a releasing paper is stuck onto the surface of the resin layer 2 as shown in FIG. 1(*a*).

At its use, as shown by an imaginary line, the releasing paper 3 is peeled from the surface of the resin layer 2 and the surface of the resin layer 2 is stuck onto a steel plate 4 as shown in FIG. 1(*b*). Moreover, in the case that the resin layer 2 comprises the foaming composition, the layer is subsequently foamed, crosslinked, and cured by heating it to a predetermined temperature, e.g., 160 to 210° C. to form a foamed layer 5 as shown in FIG. 1(*c*).

Such pressure-sensitive adhesive sheet for steel plates according to the invention can be suitably used for reinforcing and damping body steel plates of automobiles where weight saving is required. For example, in the case that it is used for reinforcing body steel plates of automobiles, after the resin layer is formed from the foaming composition and is stuck during an assembly step of the body steel plates, the sheet is used so as to form the foamed layer by heating it with use of the heat supplied during electrodeposition coating to foam, crosslink, and cure the resin layer.

Moreover, in the case that the sheet is used for damping body steel plates of automobiles, it is used so as to form the resin layer from the rubber composition and stick the sheet at the assembly step of the body steel plates of automobiles.

The pressure-sensitive adhesive sheet for steel plates according to the invention is characterized in that the backing comprises a resin-coated glass cloth obtainable by coating a glass cloth with a resin emulsion (A) followed by coating with a resin emulsion (B) which is different from the resin emulsion (A).

In such resin-coated glass cloth, the loosing of glass filaments from the glass cloth can be prevented and/or rigidity of the glass cloth can be controlled by coating the glass cloth with the resin emulsion (A) and furthermore, the adhesiveness with the foaming resin layer or rubber composition layer which is the resin layer constituting the pressure-sensitive adhesive sheet for steel plates can be improved by coating the resulting glass cloth with the resin emulsion (B).

Accordingly, the obtained sheet can have appropriate rigidity and flexibility necessary as a pressure-sensitive adhesive sheet for steel plates and further can realize an excellent workability such as punching and cutting.

Furthermore, use of the styrene-based resin emulsion as the resin emulsion (A) can impart appropriate rigidity and flexibility necessary as the backing and also reduce the generation of organic volatile components such as formaldehyde and acetaldehyde. Moreover, use of the epoxy-based resin emulsion as the resin emulsion (B) can improve the adhesiveness with the foaming resin layer or rubber composition layer mainly composed of epoxy resin and also reduce the generation of organic volatile components such as formaldehyde and acetaldehyde.

Therefore, the pressure-sensitive adhesive sheet for steel plates according to the invention can be effectively used as a pressure-sensitive adhesive sheet for steel plates which has a sufficient reinforcing or damping property toward steel plates and also which can sufficiently reduce the generation of organic volatile components such as formaldehyde and acetaldehyde, the sheet being stuck onto steel plates of various industrial machinery, for example, transport machinery such as automobiles.

EXAMPLES

The following will describe the invention in more detail with reference to Examples and Comparative Examples, but the invention is by no means limited thereto.

(Preparation of Backing 1)

Using "G75 1/0 1Z" (manufactured by Unitika Glass Fiber Co., Ltd.) as the warp and the weft, a glass cloth having a cloth density of 44 yarns/25 mm for the warp and 33 yarns/25 mm for the weft and a weight of 210 g/cm$^2$ was weaved by an air-jet type loom. Then, the glass cloth was thermally treated at 400° C. for 30 hours to remove a sizing agent. Using an emulsion which was adjusted in such a concentration that the total amount became 1 L by adding 600 g of "Saibinol EK-61" (manufactured by Saiden Chemical Industry Co., Ltd., a styrene-acrylic copolymer: 55% by weight of acrylic resin component, 45% by weight of styrene resin component, and 40% by weight of solid matter concentration) into water as a treating agent for primary treatment, the glass cloth obtained after the above thermal treatment was subjected to dipping treatment in the emulsion and the liquid was squeezed out with a mangle.

Then, after drying at 170° C. for 90 seconds, the total adhered amount of the styrene resin component and the acrylic resin component in the glass cloth was adjusted to 5% by weight. Separately, there was prepared an emulsion adjusted in such a concentration that the total amount became 1 L by adding 20 g of "EpiRez 5003W55" (manufactured by Japan Epoxy Resins Co., Ltd., an aqueous epoxy resin and 50% by weight of solid matter concentration) into water, as a treating agent for secondary treatment. Using the emulsion, the resulting glass cloth was subjected to dipping treatment and the liquid was squeezed out with a mangle.

Then, after drying at 170° C. for 90 seconds, the adhered amount of the epoxy resin component in the glass cloth was adjusted to 0.05% by weight based on the total amount of the glass cloth to prepare a backing 1.

(Preparation of Backing 2)

A backing 2 was prepared in the same manner as in Example 1 except that the adhered amount of a melamine resin component in the glass cloth was adjusted to 5% by weight using an emulsion adjusted in such a concentration that the total amount became 1 L by adding 400 g of "Milben SM850" (manufactured by Showa Hipolymer Co., Ltd., a melamine-formaldehyde polycondensate and 80% by weight of solid matter concentration) into water as a treating agent for primary treatment instead of "Saibinol EK-61", an aqueous solution adjusted in such a concentration that the total amount became 1 L by adding 4 g of "Milben Fixer LC-5" (manufactured by Showa Hipolymer Co., Ltd., a higher amine hydrochloride and 50% by weight of solid matter concentration) into water was used as a melamine resin-curing agent, and the secondary treatment was omitted.

(Evaluation of Backing)

On the obtained backings 1 and 2, the following evaluation was carried out. The results are shown in Table 1.

(Tensile Strength)

It was measured in accordance with JIS R3420.

(Tensile Modulus)

It was calculated from an initial slope of the SS curve obtained during the measurement of the above tensile strength.

(Loosing Property)

After the backing was left on standing at an atmosphere of 210° C. for 30 minutes, the presence of loosing of filaments from the glass cloth was checked. ○ represents no loosing of the filaments and X represents the presence of loosing of the filaments.

TABLE 1

|  |  | Backing 1 | Backing 2 |
|---|---|---|---|
| Tensile strength (N/25 mm) | Longitudinal direction | 680 | 700 |
|  | Lateral direction | 420 | 440 |
| Tensile modulus (N/mm$^2$) | Longitudinal direction | 12000 | 12500 |
|  | Lateral direction | 9000 | 9500 |
| Loosing property | Longitudinal direction | ○ | ○ |
|  | Lateral direction | ○ | ○ |

From Table 1, the backing 1 has a loosing-preventive property and rigidity nearly equal to those of the backing 2 where a widely used melamine resin was used.

(Preparation of Resin Layer)

In the mixing formulations shown in Table 2 for foaming compositions or in the mixing formulation shown in Table 3 for a rubber composition, the respective components were mixed and kneaded in a pressure kneader to prepare kneaded products 1 to 3.

TABLE 2

| Formulation |  | Kneaded product 1 | Kneaded product 2 |
|---|---|---|---|
| Foaming composition mixing formulation | SBR | 50 | — |
|  | Epoxy resin   A | 50 | — |
|  |                 B | — | 100 |
|  | Epoxy-modified SBS | 10 | — |
|  | Foaming agent | 1.5 | 8 |
|  | Epoxy resin-curing agent | 5 | 6.5 |

TABLE 2-continued

| Formulation | Kneaded product 1 | Kneaded product 2 |
|---|---|---|
| Sulfur (rubber crosslinking agent) | 10 | — |
| Zinc oxide (crosslinking accelerator) | 5 | — |
| Crosslinking accelerator | 10 | — |
| Heavy calcium carbonate (filler) | 105 | 110 |
| Terpene-aromatic liquid resin (tackifier) | 20 | — |
| C5/C9 petroleum resin (tackifier) | 40 | — |
| Carbon black (pigment) | 3 | 0.7 |

TABLE 3

| | Formulation | Kneaded product 3 |
|---|---|---|
| Rubber composition mixing formulation | Butyl rubber | 100 |
| | Heavy calcium carbonate (filler) | 170 |
| | C5 petroleum resin (tackifier) | 70 |
| | Liquid resin (softener) | 70 |
| | Carbon black (pigment) | 50 |

In this regard, the amounts are represented by "part(s) by weight" in Tables 2 and 3 and details of each component are shown below.

SBR: a styrene-butadiene random copolymer, number-average molecular weight of 240,000, styrene content of 25% by weight, Mooney viscosity of 35 (ML1+4, at 100° C.)

Epoxy resin A: a semi-solid bisphenol A-type epoxy resin, epoxy equivalent of 250 g/eqiv.

Epoxy resin B: a dimer acid-modified epoxy resin, epoxy equivalent of 650 g/eqiv.

Epoxy-modified SBS: an epoxy-modified styrene-butadiene-styrene block copolymer, styrene content of 40% by weight, epoxy equivalent of 1067 g/eqiv. (Epofriend AT501, manufactured by Daicel Chemical Industries, Ltd.)

Foaming agent: 4,4'-oxybis(benzenesulfonyl hydrazide)

Epoxy resin-curing agent: dicyandiamide

Crosslinking accelerator: dibenzodithiazyl disulfide

Liquid resin: a terpene-based liquid resin (Preparation of Pressure-sensitive Adhesive Sheet for Steel Plate)

The kneaded products 1 to 3 obtained in the above were rolled on a calendar roll to a thickness of 0.6 mm to form respective resin layers. The resin-coated glass cloths 1 and 2 obtained in the above were laminated to the respective resin layers in the combinations shown in Table 4 with pressurizing on a calendar roll and a releasing paper was stuck onto the surface opposite to the surface to which the backing in the resin layer was laminated, whereby pressure-sensitive adhesive sheets for steel plates of Examples 1 to 3 and Comparative Examples 1 to 3 were prepared.

(Evaluation of Pressure-sensitive Adhesive Sheet for Steel Plates)

In the resulting pressure-sensitive adhesive sheets for steel plates of respective Examples and Comparative Examples, the reinforcing property, oily surface adhesiveness at a low temperature, and volatile components were evaluated on Examples 1 and 2 and Comparative Examples 1 and 2. On Example 3 and Comparative Example 3, the vibration damping property, exfoliation property at heating, and volatile components were evaluated. The results were shown in Table 4.

(Reinforcing Property Test)

An antirust (Daphne oil Z-5, manufactured by Idemitsu Kosan Co., Ltd.) was applied onto the surface of a cold rolled steel plate (SPCC-SD) (manufactured by Nippon Testpanel Co., Ltd.) and the plate was leaned against a support at 20° C. overnight to effect oily surface treatment (hereinafter referred to as an oily surface cold-rolled steel plate).

The releasing paper of each of pressure-sensitive adhesive sheets for a steel plate of Examples 1 and 2 and Comparative Examples 1 and 2 was peeled off and each pressure-sensitive adhesive sheet for steel plates was stuck onto the oily surface of the oily surface cold-rolled steel plate having a size of 25 mm wide×150 mm long×0.8 mm thick under an atmosphere of 20° C. and heated at 160° C. for 20 minutes to foam the resin layer, whereby each test piece was obtained.

Thereafter, in the state that the steel plate was placed upward, each test piece was supported at a span of 100 mm. At the center in the longitudinal direction, a test bar was let down from above in the perpendicular direction at a compression rate of 1 mm/minute and flexural strength (N) at the time when the foamed layer was displaced by 1 mm since the bar had come into contact with the steel plate was evaluated as a reinforcing property.

(Test for Oily Surface Adhesiveness at Low Temperature)

Each of pressure-sensitive adhesive sheets for steel plates of Examples 1 and 2 and Comparative Examples 1 and 2 was cut into a width of 25 mm and, after the releasing paper was peeled off, the sheet was attached by pressure onto the oily surface of the oily surface cold-rolled steel plate under an atmosphere of 5° C. with a 2 kg roller.

After 30 minutes, adhesive force (N/25 mm) was measured by 90° peeling test (drawing rate of 300 mm/minute), the force being evaluated as oily surface adhesiveness at a low temperature.

(Vibration Damping Test)

The releasing paper of each of pressure-sensitive adhesive sheets for steel plates of Example 3 and Comparative Example 3 was peeled off and each pressure-sensitive adhesive sheet for steel plates was stuck onto the oily surface of the oily surface cold-rolled steel plate having a size of 10 mm wide×220 mm long×0.8 mm thick. After heating at 180° C. for 20 minutes, the whole was cooled to room temperature and loss coefficient η which was a measure of vibration damping property was measured by the central vibration method.

(Exfoliation Property at Heating)

Each of pressure-sensitive adhesive sheets for steel plates of Example 3 and Comparative Example 3 was cut into a piece of 50 mm wide×10 mm long and, after peeling off the releasing paper, the sheet was attached by pressure onto the oily surface of the oily surface cold-rolled steel plate with reciprocating a 2 kg roller once. Then, the steel plate was placed in a slightly slant state from the perpendicular direction so that the side of the steel plate to which the pressure-sensitive adhesive sheet for steel plates was stuck had an angle of 70° against the placing floor. After baking at 180° C. for 3 minutes, deformation and exfoliation of the pressure-sensitive adhesive sheet for steel plates were investigated.

(Analysis of Volatile Components)

Each of pressure-sensitive adhesive sheets for steel plates of Examples 1 to 3 and Comparative Examples 1 to 3 was cut so as to have an area of 80 cm$^2$, whereby test pieces were prepared. Formaldehyde was collected by the 10 L Tedler bag method and the amount was quantitatively determined by gas chromatography.

TABLE 4

| | Examples/Comparative Examples | | | | | |
|---|---|---|---|---|---|---|
| | Example 1 | Comparative Example 1 | Example 2 | Comparative Example 2 | Example 3 | Comparative Example 3 |
| Backing | Backing 1 | Backing 2 | Backing 1 | Backing 2 | Backing 1 | Backing 2 |
| Resin layer | Kneaded product 1 | Kneaded product 1 | Kneaded product 2 | Kneaded product 2 | Kneaded product 3 | Kneaded product 3 |
| Reinforcing property (N) | 21.2 | 22.3 | 24.6 | 24.3 | | |
| Oily surface adhesiveness at low temperature (N/25 mm) | 2.4 | 2.2 | 0.5 | 0.4 | | |
| Loss coefficient η | | | | | 0.40 | 0.35 |
| Exfoliation property at heating | | | | | No exfoliation | No exfoliation |
| Generated amount of formaldehyde (µg/test piece) | 0.08 | 4.08 | 0.077 | 3.95 | 0.078 | 4.05 |

From Table 4, it is revealed that the pressure-sensitive adhesive sheet for steel plates of each Example exhibits good oily surface adhesiveness and reinforcing or damping property nearly equal to those of the melamine resin-coated glass cloth and also a remarkably reduced generation of a volatile component (formaldehyde).

As mentioned in the above, the pressure-sensitive adhesive sheet for steel plates according to the invention has sufficient reinforcing or damping property toward steel plates and also can sufficiently reduce the generation of organic volatile components such as formaldehyde. Therefore, the pressure-sensitive adhesive sheet for steel plates according to the invention can be effectively used with sticking to steel plates for various industrial machinery, for example transport machinery such as automobiles.

While the invention has been described in detail and with reference to specific embodiments thereof, it will be apparent to one skilled in the art that various changes and modifications can be made therein without departing from the scope thereof.

This application is based on Japanese patent applications No. 2003-206723 filed on Aug. 8, 2003, the entire contents thereof being hereby incorporated by reference.

What is claimed is:

1. A pressure-sensitive adhesive sheet for steel plates, which comprises a backing and a resin layer, wherein the backing comprises a resin-coated glass cloth obtainable by coating a glass cloth with a resin emulsion (A) selected from a styrene-based resin emulsion, an acrylic resin emulsion, a vinyl acetate resin emulsion, and an ethylene-vinyl acetate (EVA) resin emulsion, and thereafter followed by coating with a resin emulsion (B) selected from an epoxy-based resin emulsion, a urethane-based resin emulsion and an olefin-based resin emulsion.

2. The pressure-sensitive adhesive sheet according to claim 1, wherein the resin emulsion (A) and the resin emulsion (B) substantially comprise no melamine resin in the resin-coated glass cloth.

3. The pressure-sensitive adhesive sheet according to claim 1 or 2, wherein the resin emulsion (A) is a styrene-based resin emulsion in the resin-coated glass cloth.

4. The pressure-sensitive adhesive sheet for steel plates according to claim 1 or 2, wherein the resin emulsion (B) is an epoxy-based resin emulsion in the resin-coated glass cloth.

5. The pressure-sensitive adhesive sheet according to claim 1 or 2, wherein the resin emulsion (A) is a styrene-based resin emulsion and the resin emulsion (B) is an epoxy-based resin emulsion in the resin-coated glass cloth.

6. The pressure-sensitive adhesive sheet according to claim 1, wherein, in the resin-coated glass cloth, the resin emulsion (A) is attached to the glass cloth in an amount of 2 to 15% by weight as dry weight based on the total amount of the glass cloth, and the resin emulsion (B) is attached to the glass cloth in an amount of 0.01 to 5% by weight as dry weight based on the total amount of the glass cloth.

7. The pressure-sensitive adhesive sheet according to claim 1, wherein the resin layer comprises a foaming resin composition comprising an epoxy resin and a foaming agent.

8. The pressure-sensitive adhesive sheet according to claim 7, wherein the epoxy resin is an aromatic epoxy resin.

9. The pressure-sensitive adhesive sheet according to claim 1, wherein the resin layer comprises a foaming resin composition comprising an aromatic epoxy resin, a styrene-based synthetic rubber, and a foaming agent.

10. The pressure-sensitive adhesive sheet according to claim 1, wherein the resin layer comprises a rubber composition comprising a rubber.

* * * * *